United States Patent
Dandekar et al.

(10) Patent No.: US 8,224,712 B2
(45) Date of Patent: Jul. 17, 2012

(54) POINT OF SALE PERSONALIZATION OF AN INFORMATION HANDLING SYSTEM

(75) Inventors: Shree Dandekar, Round Rock, TX (US); Bogdan Odulinski, Austin, TX (US)

(73) Assignee: Dell Products L.P., Round Rock, TX (US)

(*) Notice: Subject to any disclaimer, the term of this patent is extended or adjusted under 35 U.S.C. 154(b) by 1097 days.

(21) Appl. No.: 12/102,271

(22) Filed: Apr. 14, 2008

(65) Prior Publication Data
US 2009/0259481 A1 Oct. 15, 2009

(51) Int. Cl.
*G06Q 30/00* (2006.01)

(52) U.S. Cl. .................. 705/26.5; 705/26.1

(58) Field of Classification Search .............. 705/26–27
See application file for complete search history.

(56) References Cited

U.S. PATENT DOCUMENTS

| | | | |
|---|---|---|---|
| 6,714,937 B1* | 3/2004 | Eynon et al. | 705/26.5 |
| 6,985,876 B1* | 1/2006 | Lee | 705/26.5 |
| 7,835,896 B1* | 11/2010 | Rode | 703/14 |
| 2004/0140987 A1 | 7/2004 | Howell, Jr. et al. | |
| 2005/0172284 A1 | 8/2005 | Dandekar et al. | |
| 2006/0136429 A1 | 6/2006 | Dandekar et al. | |
| 2006/0136589 A1 | 6/2006 | Konig et al. | |
| 2006/0156406 A1 | 7/2006 | Bantz et al. | |
| 2006/0206912 A1 | 9/2006 | Klarfeld et al. | |
| 2006/0293921 A1 | 12/2006 | McCarthy et al. | |
| 2007/0027931 A1 | 2/2007 | Heckenbach | |
| 2007/0055707 A1 | 3/2007 | Dandekar et al. | |
| 2007/0083441 A1 | 4/2007 | Harper et al. | |
| 2007/0083636 A1 | 4/2007 | Knespel et al. | |
| 2007/0112792 A1 | 5/2007 | Majumder | |
| 2007/0113069 A1 | 5/2007 | Gentil et al. | |
| 2007/0136670 A1 | 6/2007 | Broos et al. | |
| 2007/0162841 A1 | 7/2007 | Bailey et al. | |

OTHER PUBLICATIONS

Chee, Tan Kien "Configure the PC to Meet Your Needs" (New Straits Times, Nov. 6 1995, p. 32).*
Yin, Jianwen et al; U.S. Appl. No. 11/563,021, "Methods, Apparatus and Media for Modifying Information," filed on Nov. 23, 2006.
Carlton Andrews; U.S. Appl. No. 11/624,261; "System and Method for Configuring Voice Over IP Devices;" filed on Jan. 18, 2007.
Robertson, Robert Hunter et al; U.S. Appl. No. 11/962,408; "Information Handling System Personalization;" filed on Dec. 13, 2007.

* cited by examiner

*Primary Examiner* — Adam Levine
*Assistant Examiner* — Ethan D Civan
(74) *Attorney, Agent, or Firm* — Haynes and Boone, LLP

(57) ABSTRACT

A system for point of sale personalization of an information handling system (IHS), includes one or more subsystems to allow a customer to access a server to select a model of IHS, allow the customer to choose an operating system for the IHS, allow the customer to choose hardware for the IHS, simulate the IHS to the customer including the operating system and the hardware, receive personalization data from the customer, store the personalization data, assemble the IHS, including the hardware and installing the operating system, and download the personalization data to the IHS.

21 Claims, 5 Drawing Sheets

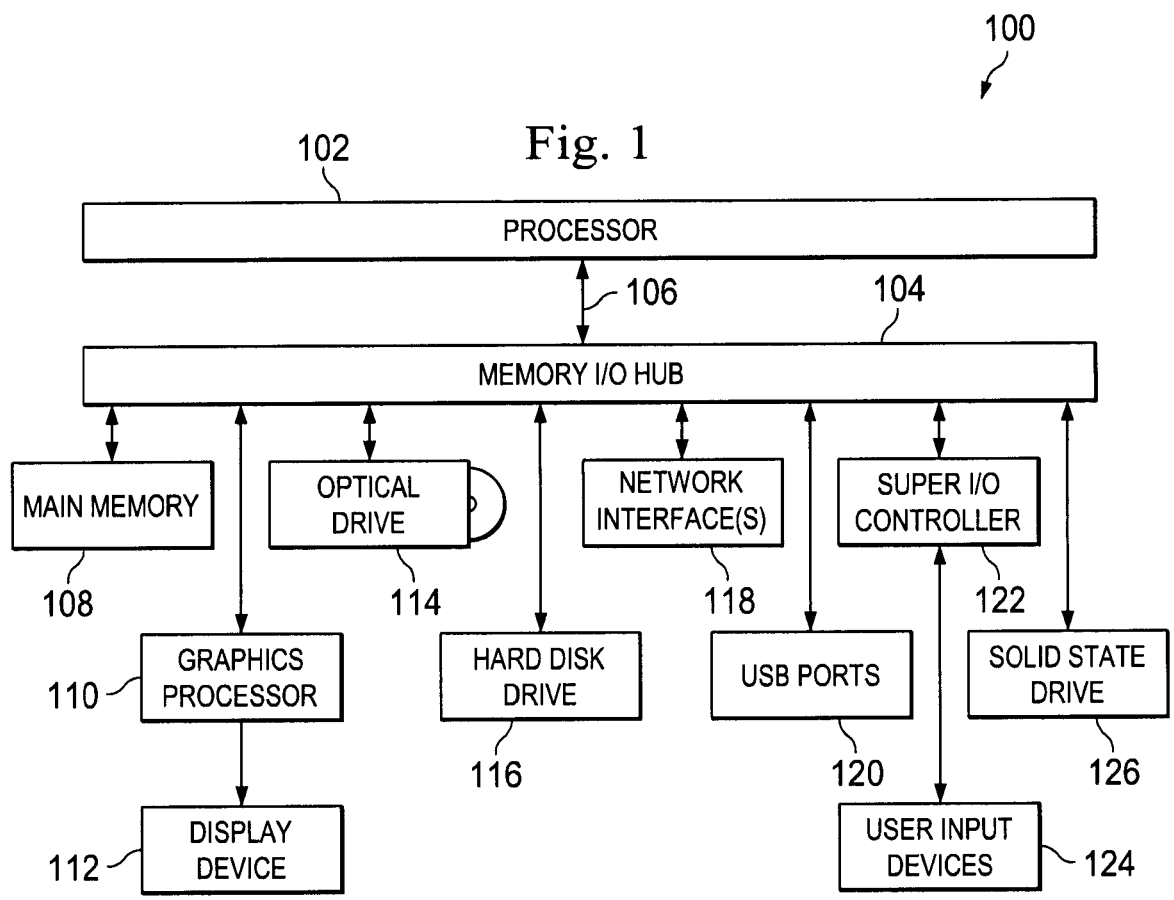

POINT OF SALE PERSONALIZATION OF AN INFORMATION HANDLING SYSTEM

BACKGROUND

The present disclosure relates generally to information handling systems (IHSs), and more particularly to point of sale personalization of the IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Generally, when purchasing an IHS, the customer has few choices to customize or personalize the IHS before purchase. However, it would be advantageous to an IHS manufacturer to allow the customer to personalize the IHS to increase ease of use after receipt of the IHS by the customer and to increase desire for the IHS.

Accordingly, it would be desirable to provide an improved point of sale personalization of an information handling system absent the deficiencies described above.

SUMMARY

According to one embodiment, a system for point of sale personalization of an information handling system (IHS) includes one or more subsystems to allow a customer to access a server to select a model of an IHS, allow the customer to choose an operating system for the IHS, allow the customer to choose hardware for the IHS, simulate the IHS to the customer including the operating system and the hardware, receive personalization data from the customer, store the personalization data, assemble the IHS, including the hardware and installing the operating system, and download the personalization data to the IHS.

BRIEF DESCRIPTION OF THE DRAWINGS

FIG. 1 illustrates an embodiment of an information handling system (IHS).

DETAILED DESCRIPTION

Figure 2A:
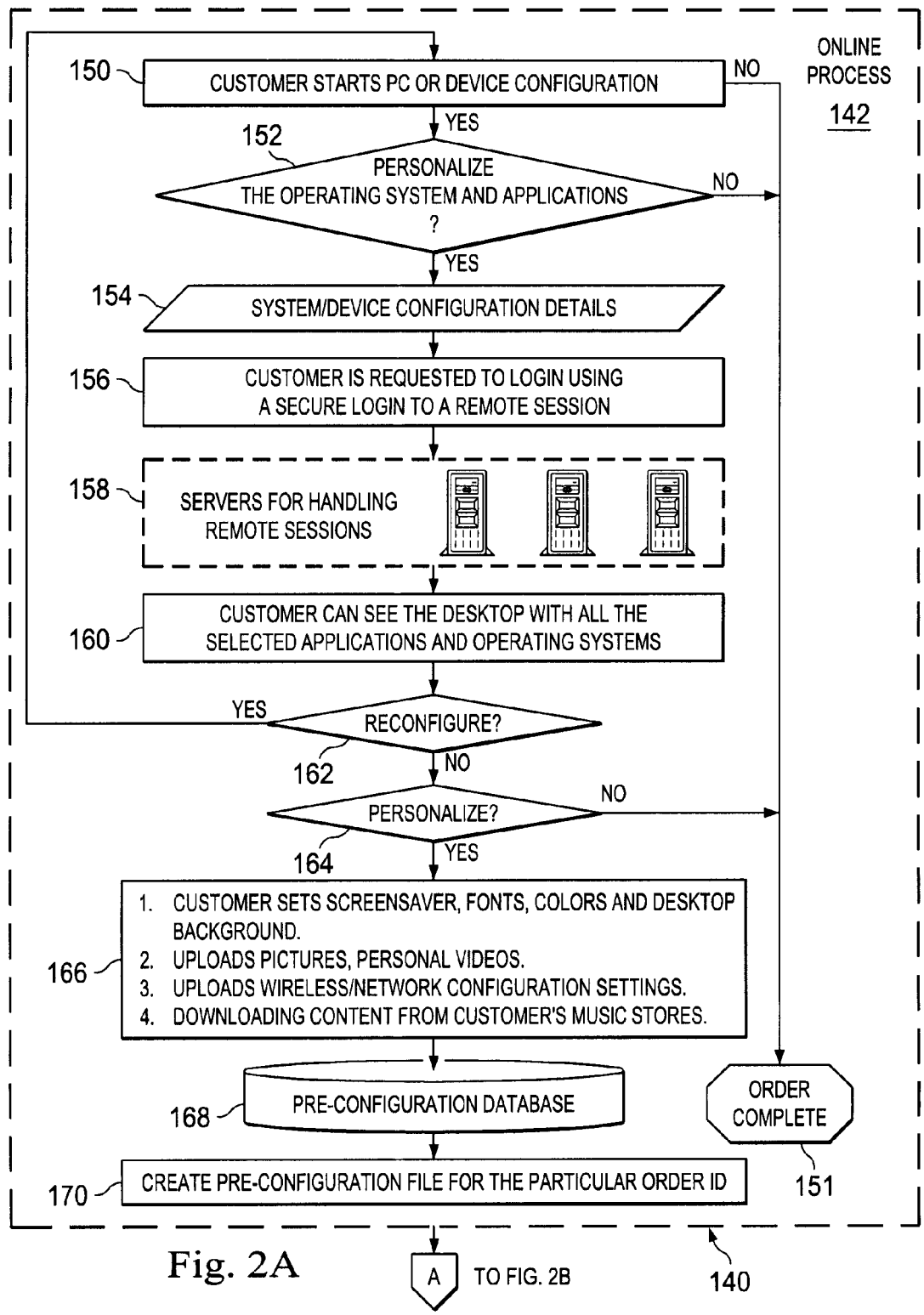
FIG. 2A illustrates an online process portion of a flow chart for one embodiment of a point of sale personalization for an information handling system.

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, an MP3 player, a mobile telephone, an email device, a personal planner device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSD) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2B:
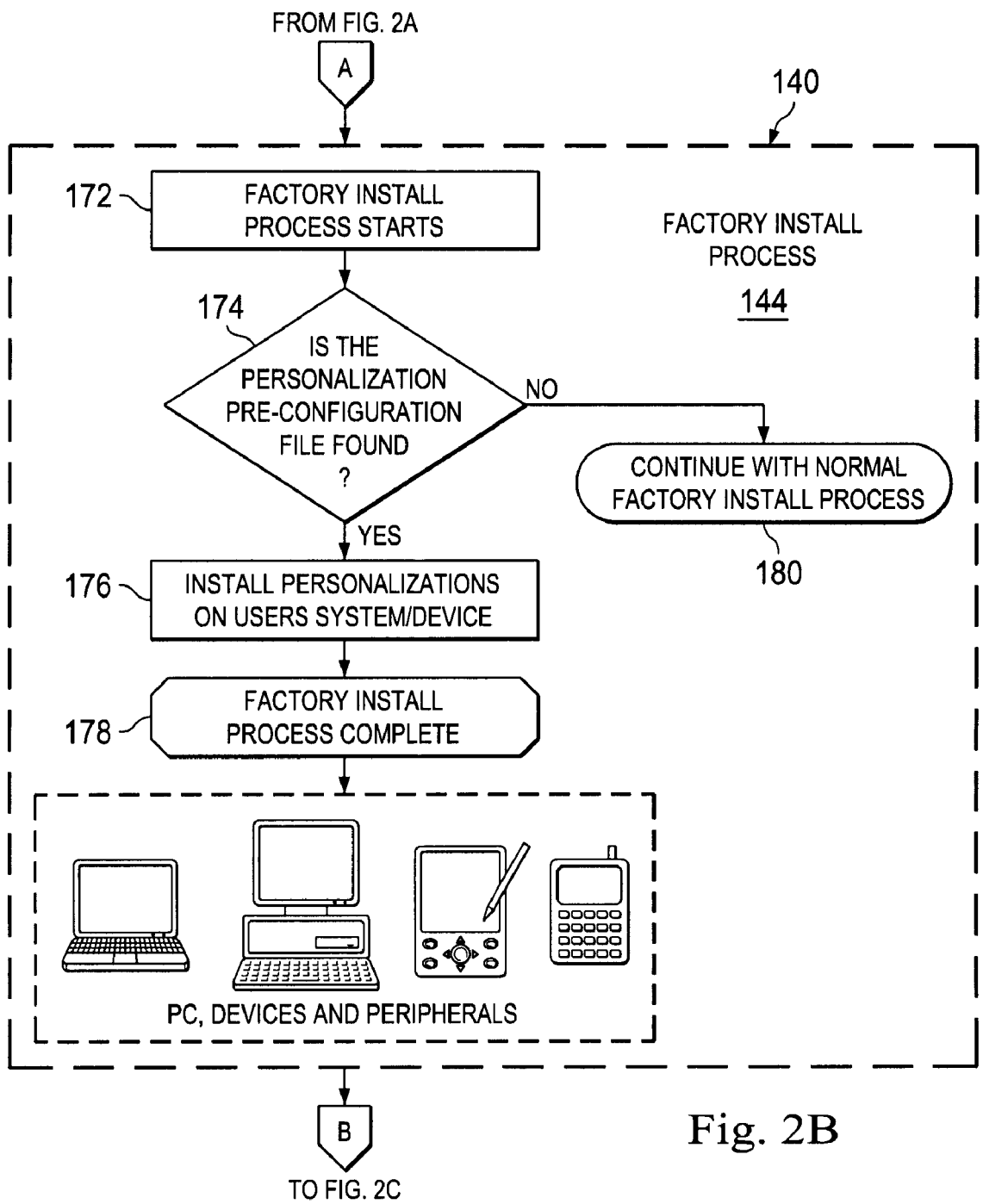
FIG. 2B illustrates a factory install portion of a flow chart for one embodiment of a point of sale personalization for an information handling system.
Figure 2C:
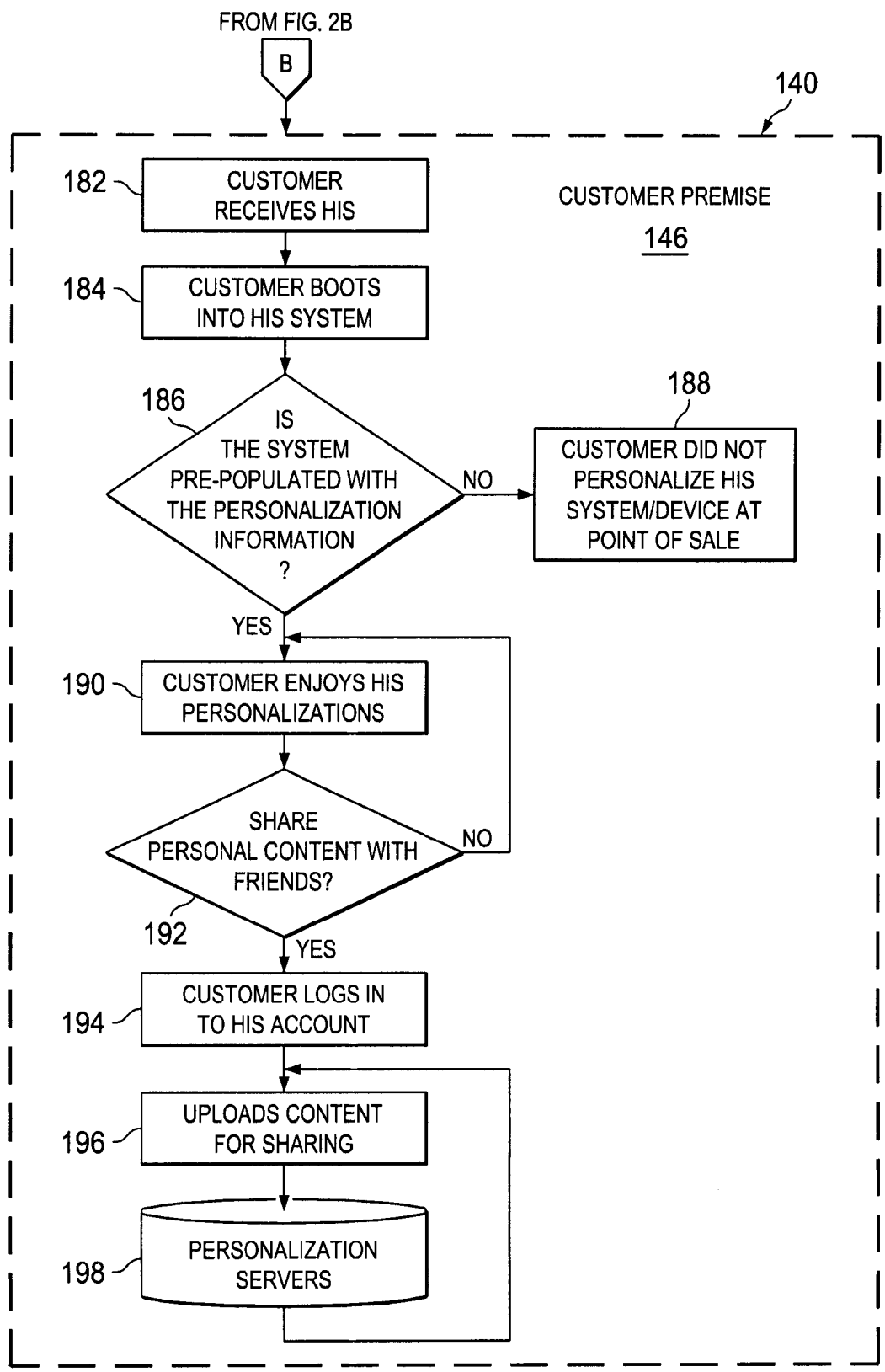
FIG. 2C illustrates a customer premise portion of a flow chart for one embodiment of a point of sale personalization for an information handling system.

FIGS. 2A-C show a flow chart for one embodiment of a point of sale personalization method 140 for configuring, ordering and personalizing an information handling system 100. In an embodiment, this method 140 allows a customer to begin an online process 142 of the configuration of an IHS 100 or other type of device at 150 via a network connection, such as an Internet connection. The method 140 may interact with the customer through a series of interactive screens allowing the customer to receive information and input information to configure the IHS 100. If the customer does not wish to configure an IHS 100, the method 140 ends at 151. If the customer does wish to configure an IHS 100, the method 140 proceeds to block 152, where the method 140 determines whether the customer wants to personalize the IHS 100, the operating system, and/or the applications for the IHS 100. If the customer does not wish to personalize the IHS 100, the method 140 ends at 151. If the customer does wish to personalize the IHS 100, the method 140 proceeds to block 154, where the method 140 receives IHS system and device configuration details from the customer. The method 140 then proceeds to block 156, where the method 140 may request the customer to login to one or more servers 158 using a secure login system to a remote session. The secure login allows the manufacturer to receive personal data from the customer and relate the personal data to the secure login and securely store the data via one or more servers 158. After the customer has entered the desired configuration of the IHS 100 the method 140 simulates the operation of the desired IHS 100 at block 160 using both simulated hardware (e.g., processor, memory, and etc.) and software (e.g., operating system, applications, and etc.) allowing the customer to "see" or "test drive" the configured IHS 100. The method 140 then proceeds to decision block 162, where the method determines whether the customer wishes to reconfigure the IHS 100 after completing the "test drive" of the IHS 100 in block 160. If yes, the customer wants to reconfigure the IHS 100, the method return to block 150 where the customer begins the process again. If the customer is satisfied with the configuration and does not want to reconfigure the IHS 100, the method proceeds to decision block 164 where the method 140 determines whether the customer wants to personalize the configured IHS 100. If no, the customer does not want to personalize the IHS 100 and wants to complete the transaction of the IHS 100 as configured, the method proceeds to block 151 where the order is completed and the customer purchases the configured IHS 100. At this point, the method of manufacturer of the IHS assembles the IHS 100 as configured by the customer and delivers the IHS 100 to the customer without adding any personalization data to the IHS. On the other hand, if the customer does want to personalize the IHS, the method proceeds to block 166 where the customer is allowed to set screensaver settings, fonts, colors, desktop background, upload pictures, videos, and other data, set wireless/network configuration settings, and transfer other data from the customer's present IHS or from other sources. In other words, the customer may transfer any data or information from any source to the manufacturer for installing on the configured IHS 100. The method 140 then proceeds to block 168, where the manufacturer may receive, categorize, and securely store the customer's personalization data via one or more servers 158 to a per-configuration database. Using the received personalization data from the customer, the method 140 proceeds to block 170, where the manufacturer creates a pre-configuration file for the particular IHS order.

The method 140 next proceeds to a factory install process 144 where the manufacturer begins the factory install process 144 at block 172 after the assembly of the IHS 100 is completed. The method 140 then proceeds to decision block 174 where the method determines whether a personalization pre-configuration file from block 170 is found on a pre-configuration database at 168. If yes, the method 140 proceeds to block 176 where the method 140 installs the personalization data from the pre-configuration data file on the customer's IHS 100. After the personalization data is installed and the settings are set on the customer's IHS 100, the factory install process is completed at 178 and the method 140 continues at block 180. If the method 140 determines at decision block 174 that there is not a pre-configuration file found, the method continues to block 180 where the method 140 continues with a standard factory install process to install the non-personalization data, such as, the operating system and applications. Once completed, the manufacturer delivers the IHS 100 to the customer.

The method 140 then proceeds to a customer premise or customer use phase 146 of the method 140 allowing the customer to use the IHS 100 and access the personalization data stored by the manufacturer. This phase of the method 140 continues at block 182 where the customer receives the IHS 100. After receiving the IHS 100, the method continues to block 184 where the IHS is started and booted up. After the boot up, the method proceeds to decision block 186 where the method 140 determines whether the IHS 100 is populated with personalization data. If no, the IHS 100 is not populated with personalization data, the method 140 proceeds to block 188 where the method 140 ends. If yes, the IHS 100 is populated with personalization data, the method 140 proceeds to block 190 where the customer has access to the personalization data on the IHS. The method 140 then proceeds to decision block 192 where the method 140 determines whether the customer wants to share the personalization data with others. If no, the customer does not want to share the personalization data with others, the method 140 returns to block 190. If yes, the customer does want to share the personalization data with others, the method 140 proceeds to block 194 where the customer logs into an account with the manufacturer. After the customer gains access to the account, the method 140 proceeds to block 196 where the customer may upload other personalization data to one or more personalization servers at 198. Then, the customer may provide access, such as a login password to others to gain access to the personalization data at the personalization servers 198. Thus, the customer and others may access the personalization data, such as, photos, videos, music, and/or any other data.

Figure 3:
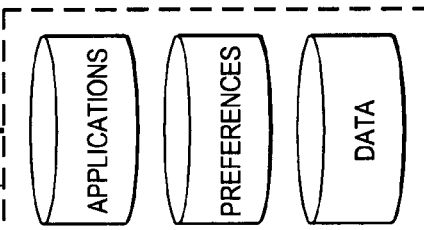
FIG. 3 illustrates a flow chart for one embodiment of a personalization system for a replacement information handling system.

FIG. 3 illustrates a flow chart for one embodiment of a personalization system 250 for a replacement information handling system. In an embodiment, an original IHS 100 device, such as, a pc, email device, mobile telephone etc., may be replaced by the manufacturer or other warranting entity with a replacement device 254 upon the event of a failure of the original device 252 or for any other reason. In an embodiment, the replacement device 254 provides the same or similar experience to the customer as the original device 252. Thus, upon a failure of the original device 252, the customer may receive a replacement device 254 with the personalization data pre-loaded on the replacement device 254. As shown, the personalization data, such as, applications, preferences, and/or data 260 on the original device 252 may be continuously backed up to a personalization service 264 via a data management service 262. The applications, preferences, and/or data 260 may then be continuously synchronized to the original device 252 via the data management service 262, thus ensuring that the personalization service at the manufacturer's factory 266 will always have a relatively current version of the applications, preferences, and/or data 260. In the event of a need for a replacement device 254, the manufacturer may pre-load the replacement device 254 with the personalization data 260 at the factory 266 so that the customer may receive the replacement device 254 in essentially the same configuration as the customer's original device.

A person having ordinary skill in the art should readily understand that any type of data may be used to personalize the IHS to the customer's specifications. For example, a photo file may be transferred from the customer to the IHS manufacturer and in an embodiment, the manufacturer may preload the photo as a background image on the operating system desktop. In another embodiment, the manufacturer may print or otherwise show the image on the outside cover of the IHS 100. Thus, the uses of personalization data for the IHS 100 is limitless.

In software and services related personalization, the manufacturer many offer customers an opportunity to select their operating system and software applications at point of sale and simulate the system allowing the customer to actually be able to "test drive" or "see" the operating system and installed applications at the point of sale. If the customer does not like a particular operating system or an application, the customer may go back to the configurator (e.g. at 162) and update the configuration with another operating system or application type and reconfigure the system. In an embodiment, the customer may set a screensaver and desktop background on the IHS 100. For example, the customer may change the standard desktop background image with an image of the customer's pet or family picture. In an embodiment, the customer may have the ability to upload personal content to the system. For example, the customer may load family pictures to the manufacturer so that the manufacturer may then load the pictures to an IHS 100 to be shipped to the customer's mother or to anyone else. The present system may be used to load personal videos to the IHS 100 by the manufacturer. The present system may be used for changing the font size and/or colors on the operating system. In an embodiment, the present system may be used for pre-populating the wireless setting to enable the system to connect to the customer's home network when the customer receives it. A customer may have the ability to customize a weather widget, a stock ticker, a news really simple syndication feed, or any other perference on the IHS 100. The customer may use the system to have the manufacturer pre-load email contacts to the IHS 100. In addition, any other type of personalization data may be used to personalize the IHS by the manufacturer before delivery to the customer.

In a hardware related presentation, the manufacturer may simulate the configured IHS to the customer given the type of graphics card 110 or CPU 102 selected, the customer may be able to see the performance related comparisons using different configuration scenarios simulated on the IHS 100, such as, trying to launch multiple applications, listening to sample music, watching sample videos, and a variety of other hardware related features.

On devices such as handhelds, MP3 players, mobile phones, DMA's, and a variety of other devices, the manufacturer may pre-populate the wireless setting to enable IHS 100 to connect to the customer's home network when the customer receives it. In an embodiment, the manufacturer may pre-load or download content from the customers music stores to an MP3 player or to set background, music tones or a variety of other features on the customer's mobile telephone. The system may also allow the ability to upload music tones to the customer's telephone at a point of sale for the device. In another embodiment, the system may be used to upload customer contacts to the mobile telephone before delivery of the telephone to the customer.

In summary, the present disclosure provides for a customer to conduct an online IHS 100 ordering process having an option to personalize the IHS. This may be accomplished using a server farm that may be connected to the IHS manufacturer's online store. The servers may be used to manage and facilitate remote sessions for various customers who decide to personalize their system at the point of sale. The online process may have a session manager to manage various virtual sessions to accommodate multiple customers at the same time. The system provides an upload component to enable the customer to upload personal content such as pictures, videos, settings, and the like to the server. After the personalizations are finalized by the customer, a personalization file is created from the customer order. Then, during the build-to-order process, the personalization file is invoked and the data related to the file is downloaded from a personalization server to the customers systems. The personalized data may be stored on the manufacturer's systems for the period of customer IHS warranty or any other period of time. The personalized servers may be further enhanced to allow customers to manage personal data on a day-to-day basis. For example, the system may be used for sharing pictures, videos and music with friends. In an embodiment, customers may be required to subscribe to a service to use these servers on a regular basis. It should be readily understood that the present disclosure applies to both PCs and any other devices that can be personalized with customer data. In an embodiment, the present method provides for customers to actually "see" or "test drive" the software and OS that they selected at point of sale. It describes a method to remote the customer session into a virtual desktop where the customer can see the desktop and the components selected at the point of sale. As such, the present system enables customers to choose the right hardware components for an IHS by allowing the customer to use the selected system in a virtual environment such as the customer will use. In addition, the present system provides a way to tie personalized data and applications to the IHS factory build process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) ordering system, comprising:
    at least one manufacturer IHS ordering server that is coupled to a network and operable to:
        receive, from a customer IHS over the network, a selection of an operating system for a configured IHS;
        receive, from the customer IHS over the network, a selection of hardware for the configured IHS;
        simulate, over the network on the customer IHS, the operation of the configured IHS by providing a simulated IHS on the customer IHS that includes simulations of the selected operating system and the selected hardware, wherein the simulated IHS is operable to execute IHS operations requested from the customer IHS, and wherein the execution of IHS operations permit a customer using the customer IHS to evaluate a capability of the configured IHS;
        receive personalization data from the customer IHS over the network; and
        store the personalization data in a database; and
    at least one manufacturer factory server that is coupled to the at least one manufacturer IHS ordering server and operable to:
        configure the selected hardware and the selected operating system received for the configured IHS on a physical IHS; and
        copy the personalization data to the physical IHS.

2. The system of claim 1, wherein the at least one manufacturer IHS ordering server is further operable to:
restrict access to the personalization data in the database.

3. The system of claim 2, wherein the at least one manufacturer IHS ordering server is further operable to:
provide access to the personalization data to the customer IHS over the network.

4. The system of claim 3, wherein the at least one manufacturer IHS ordering server is further operable to:
provide access to a third party IHS over the network to the personalization data in response to receiving a permission from the customer IHS over the network.

5. The system of claim 1, where the personalization data is received from the customer IHS over the network and stored in the database after the physical IHS is assembled.

6. The system of claim 1, further comprising:
at least one manufacturer replacement server that is operable to provide a replacement IHS in response to a failure of the physical IHS wherein the replacement IHS includes the selected operating system, the selected hardware, and the personalization data.

7. The system of claim 1, wherein the personalization data includes one or more of the following types of data: pictures, videos, music, screensavers, fonts, colors, backgrounds, and network configuration data.

8. At least one manufacturer server, comprising:
a processor;
a network interface to couple the server to a network; and
a computer-readable medium comprising computer-readable instructions that, when executed by the processor, cause the processor to:
receive, from a customer IHS over the network, a selection of operating system for a configured IHS;
receive, from the customer IHS over the network, a selection of hardware for the configured IHS;
simulate, over the network on the customer IHS, the operation of the configured IHS by providing a simulated IHS on the customer IHS that provides a simulation of the selected operating system and the selected hardware, wherein the simulated IHS is operable to execute IHS operations that are requested from the customer IHS, and wherein the execution of IHS operations permit a customer using the customer IHS to evaluate a capability of the configured IHS;
receive personalization data from the customer IHS over the network;
store the personalization data in a database;
install the selected operating system on a physical IHS; and
copy the personalization data to the physical IHS.

9. The server of claim 8, wherein the at least one manufacturer server is further operable to:
restrict access to the personalization data in the database.

10. The server of claim 9, wherein the at least one manufacturer server is further operable to:
provide access to the personalization data to the customer IHS over the network.

11. The server of claim 10, wherein the at least one manufacturer server is further operable to:
provide access for a third party IHS over the network to the personalization data in response to receiving a permission from the customer IHS over the network.

12. The server of claim 8, wherein the personalization data is received from the customer ISH over the network and stored in the database after the physical IHS is assembled.

13. The server of claim 8, wherein the at least one manufacturer server is further operable to:
provide a replacement IHS in response to a failure of the configured IHS, wherein the replacement IHS includes the selected operating system, the selected hardware, and the personalization data.

14. The server of claim 8, wherein the personalization data includes one or more of the following types of data: pictures, videos, music, screensavers, fonts, colors, backgrounds, and network configuration data.

15. A method for providing an information handling system (IHS) to a customer, the method comprising:
receiving, from a customer IHS over a network, a selection of an operating system for a configured IHS;
receiving, from the customer IHS over the network, a selection of hardware for the configured IHS;
simulating, over the network on the customer IHS the operation of the configured IHS by providing a simulated IHS on the customer IHS that includes simulations of the selected operating system and the selected hardware such that the simulated IHS is operable to execute IHS operations requested from the customer IHS, wherein the execution of IHS operations permit a customer using the customer IHS to evaluate a capability of the configured IHS;
receiving personalization data from the customer IHS over the network;
storing the personalization data in a database;
configuring the selected hardware and the selected operating system on a physical IHS; and
copying the personalization data to the physical IHS.

16. The method of claim 15, further comprising:
restricting access to the personalization data in the database.

17. The method of claim 16, further comprising:
providing access to the personalization data to the customer IHS over the network.

18. The method of claim 17, further comprising:
providing access for a third party IHS over the network to the personalization data in response to receiving a permission from the customer IHS over the network.

19. The method of claim 15,
wherein the personalization data is received from the customer IHS over the network and stored in the database after the physical IHS is assembled.

20. The method of claim 1, further comprising:
providing a replacement IHS in response to a failure of the physical IHS, wherein the replacement IHS includes the selected operating system, the selected hardware, and the personalization data.

21. An information handling system (IHS) ordering system, comprising:
at least one manufacturer IHS ordering server that is coupled to a network and operable to:
receive, from a customer IHS over the network, a selection of an operating system for a configured IHS;
receive, from the customer IHS over the network, a selection of hardware for the configured IHS; and
simulate, over the network on the customer IHS, the operation of the configured IHS by providing a simulated IHS on the customer IHS that provides a simulation of the selected operating system and the selected hardware to allow the simulated IHS to execute IHS operations requested from the customer IHS, wherein the execution of IHS operations permit a customer using the customer IHS to evaluate a capability of the configured IHS.

* * * * *